United States Patent [19]

Parvulescu et al.

[11] Patent Number: 5,724,410
[45] Date of Patent: Mar. 3, 1998

[54] TWO-WAY VOICE MESSAGING TERMINAL HAVING A SPEECH TO TEXT CONVERTER

[75] Inventors: Adrian Parvulescu, Fish's Eddy, N.Y.; Andrew Todd Zidel, Hawthorne, N.J.

[73] Assignees: Sony Corporation, Tokyo, Japan; Sony Electronics Inc., Park Ridge, N.J.

[21] Appl. No.: 573,624

[22] Filed: Dec. 18, 1995

[51] Int. Cl.$^6$ .............................. H04M 1/65; G08B 3/10; G10L 3/00
[52] U.S. Cl. .............. 379/88; 379/93.09; 379/93.15; 340/313; 340/825.44; 358/402; 395/2.67; 395/2.79
[58] Field of Search ................... 379/52, 56.1, 57, 379/58, 67, 87, 88, 89, 90.01, 93.01, 93.05, 93.09, 93.15, 93.17, 93.24, 100.01, 100.06, 100.08, 100.13, 100.15, 100.16, 101.01, 110.01, 355; 358/402, 440; 455/31.1, 311.3, 38, 39; 340/825.44, 825.15, 311.1, 313; 395/2.79, 2.67; 364/240.9, DIG. 1

[56] References Cited

U.S. PATENT DOCUMENTS

| | | | |
|---|---|---|---|
| 3,716,848 | 2/1973 | Schonholtz et al. | 340/825.44 |
| 4,495,647 | 1/1985 | Burke et al. | 455/38 |
| 4,592,085 | 5/1986 | Watari et al. | 395/2.63 |
| 4,644,351 | 2/1987 | Zabarsky et al. | 340/825.44 |
| 4,769,642 | 9/1988 | Davis et al. | 340/825.44 |
| 4,837,798 | 6/1989 | Cohen et al. | 379/88 |
| 4,926,484 | 5/1990 | Nakano | 381/56 |
| 4,949,085 | 8/1990 | Fisch et al. | 340/825.44 |
| 4,965,569 | 10/1990 | Bennett et al. | 340/825.44 |
| 5,003,601 | 3/1991 | Watari et al. | 395/2.64 |
| 5,142,279 | 8/1992 | Jasinski et al. | 340/825.44 |
| 5,146,488 | 9/1992 | Okada et al. | 379/88 |
| 5,153,579 | 10/1992 | Fisch et al. | 340/825.22 |
| 5,333,266 | 7/1994 | Boaz et al. | 395/200 |
| 5,355,432 | 10/1994 | Tanaka et al. | 395/2.43 |
| 5,381,466 | 1/1995 | Shibayama et al. | 379/88 |
| 5,412,719 | 5/1995 | Hamamoto et al. | 340/825.44 X |
| 5,455,579 | 10/1995 | Bennett et al. | 341/110 |
| 5,459,458 | 10/1995 | Richardson et al. | 340/825.52 |
| 5,479,411 | 12/1995 | Klein | 370/110.1 |
| 5,493,609 | 2/1996 | Winseck, Jr. et al. | 379/96 |
| 5,493,692 | 2/1996 | Theimer et al. | 455/26.1 |
| 5,513,126 | 4/1996 | Harkins et al. | 364/514 A |
| 5,524,137 | 6/1996 | Rhee | 379/67 |
| 5,548,789 | 8/1996 | Nakamura | 395/853 |
| 5,588,009 | 12/1996 | Will | 371/33 |
| 5,608,786 | 3/1997 | Gordon | 379/100 |
| 5,627,528 | 5/1997 | Kuznicki | 340/825.44 |
| 5,630,060 | 5/1997 | Tang et al. | 395/200.01 |
| 5,644,627 | 7/1997 | Segal et al. | 379/67 |

OTHER PUBLICATIONS

1995 Radio Shack Catalog—p. 25 Oct. 1995.
"Value–loaded pagers, low prices create buyer's market", *Telecom Sources*, Oct., 1995.

*Primary Examiner*—Krista Zele
*Assistant Examiner*—Scott L. Weaver
*Attorney, Agent, or Firm*—Lise A. Rode, Esq.; Jerry A. Miller

[57] ABSTRACT

A two-way voice messaging terminal for communicating with a receiving terminal which may or may not be capable of reproducing a voice message transmitted from the voice messaging terminal. A voice message is digitally encoded and stored in a memory. A receiving terminal selection unit connected to the first memory preferably allows for the selection of the receiving terminal(s) to which the voice message is to be transmitted. The receiving terminal selection unit then receives the stored, digitally encoded voice message and determines whether the selected receiving terminal(s) is(are) capable of reproducing the voice message. If the receiving terminal(s) can reproduce the voice message, the voice message is transmitted to the selected receiving terminal(s). If the terminal(s) is(are) not capable of reproducing the voice message, the voice message is converted into a text message in a speech-to-text converter in the voice messaging terminal and then transmitted to the selected receiving terminal(s). The voice messaging terminal may also have a text-to-speech converter to convert a response text message into a synthesized voice message, the response text message being sent from the selected receiving terminal(s) in response to the voice message transmitted by the voice messaging terminal.

40 Claims, 5 Drawing Sheets

TWO-WAY VOICE MESSAGING TERMINAL HAVING A SPEECH TO TEXT CONVERTER

BACKGROUND OF THE INVENTION

1. Field of the Invention

This invention relates to two-way messaging systems. More particularly, it relates to a voice messaging terminal which may communicate with a receiving terminal incapable of reproducing voice messages by converting the voice message to a text message before transmission to such receiving terminal.

2. General Background

Messaging systems have become quite popular in the recent past. Paging devices, in particular, have become popular given their compact size, ease of use and relatively low cost of operation. Until recently, however, such communications systems were one-way; that is, a pager could receive incoming messages, but could not respond to same.

Currently, two-way messaging systems having limited capabilities have been introduced on a commercial basis. Such two-way messaging systems allow the receiving terminal to respond to an incoming numeric or alphanumeric message by selecting and transmitting back to the transmitting terminal, one of several predetermined responses which are preprogrammed into the receiving terminals software. In the more distant future, however, true two-way voice messaging terminals are planned to be commercially introduced. In such two-way voice messaging systems, it is anticipated that a user will be able to transmit a message to a receiving terminal which, in turn, will have the capability of responding to such transmitting terminal with a response voice message.

It is currently anticipated that the voice messages will be transmitted along a digital path for purposes of quality and efficient use of bandwidth, and therefore the voice messages will have to be coded with one of a variety of known speech encoding/decoding systems (e.g., Multi-Band Excitation (MBE), Single Band Excitation (SBE), Sub-Band Coding (SBC), Harmonic Coding, Linear Predictive Coding (LPC), Discrete Cosign Transform (DCT), Modified DCT, Fast Fourier Transform (FFT), and more recently, Code Excited Linear Prediction (CELP), Vector Sum Excited Linear Prediction (VSELP), Pitch Synchronous Innovation-CELP, and Regular Pulse Excitation-Long Term Prediction (RPE-LTP) ). Additionally, it is expected that some type of data compression algorithm will be used to compress the digitally coded voice message, in order reduce cost and make efficient use of available bandwidth.

One problem likely to be encountered with voice messaging systems, however, is that while the person transmitting a message may have the capability of transmitting and receiving a voice page, the intended recipient of the transmitted message may have a receiver which is incapable of reproducing audio signals and thus incapable of receiving such voice messages. For example, the receiving device may be a computer, a facsimile or a text-only pager, or the intended recipient may have his pager card docked into a device, such as a PDA, which may have a display, but does not have the capability of reproducing audio signals, and consequently, voice messages.

It would be desirable therefore for the person sending the message to have the capability of alternatively transmitting the message as a voice page or as a text page depending upon the technical specifications of the receiving device.

SUMMARY OF THE INVENTION

Accordingly, it is one object of the invention to provide a two-way messaging system which has the capability of transmitting either voice and/or text messages.

It is still another object of the invention to provide a voice messaging terminal wherein a user can transmit a voice message to a receiving device which does not have the capability of reproducing the voice message.

It is yet another object of the invention to provide a voice messaging terminal which has the capability of transmitting a voice message which is converted to a text message of the receiving device is not capable of reproducing the voice message.

Therefore, in accordance with one aspect of the invention, there is provided in one embodiment of the invention, a voice messaging terminal in which a voice message is digitally encoded and stored in a memory. A receiving terminal selection unit connected to the first memory preferably allows for the selection of the receiving terminal to which the voice message is to be transmitted. The receiving terminal selection unit then receives the stored, digitally encoded voice message and determines whether the selected receiving terminal is capable of reproducing the voice message. If the receiving terminal can reproduce the voice message, the voice message is transmitted to the selected receiving terminal. If it is not capable of reproducing the voice message, the voice message is converted into a text message in a speech-to-text converter in the voice messaging terminal and then transmitted to the selected receiving terminal.

According to another aspect of the invention, a microphone in the messaging terminal receives the voice message and converts the voice message into an analog electrical signal. This analog signal is then digitized in a CODEC, and the resulting coded digital signal is then stored in first memory. A receiving terminal selection unit, which preferably includes an actuator and a second memory, allows for the selection of a receiving terminal to which to transmit the voice message. If it is determined in the receiving terminal selection trait that the receiving terminal is not capable of reproducing the voice message, the stored coded digital signal representing the voice message is provided to a speech-to-text converter, where it is converted to a text message. The text message is then encoded with a communications protocol and thereafter transmitted to the selected receiving terminal. If it is determined in the receiving terminal selection unit that the receiving terminal is capable of reproducing the voice message, then the coded digital signal representing the voice message is directly transmitted, after encoding with an appropriate communications protocol.

In one embodiment of the present invention, the receiving terminal recedes the text message in a receiver. The communications protocol of the received text message is then decoded, and the thus decoded text message is stored in a memory in the receiving terminal. The text message may then be displayed on the receiving terminal's display. Such display of the text message is preferably realized upon actuation of an actuator.

In another embodiment of the present invention, the receiving terminal receives the voice message in a receive. After the received voice message communications protocol is decoded, and the thus decoded voice message stored in the receiving terminals' memory, a CODEC decodes the stored message to provide an analog signal representing the voice message, and an audio reproducing unit reproduces the analog signal as the received voice message.

In still another embodiment of the present invention the receiving terminal provides a response text message to the voice messaging terminal, which may display the text message or convert it to a voice message. The response text message is received in a receiver of the voice messaging terminal, where a decoder decodes the message's communications protocol. The text message is then stored in a memory of the voice messaging terminal. The text message may then be read from memory to a display of the voice messaging terminal, or it may be read from memory, converted to speech by a text-to-speech converter, decoded by a CODEC to provide an analog signal, and then reproduced at an audio reproducing unit of the messaging terminal.

The features of the present invention believed to be novel are set forth with particularity in the appended claims. However, the invention itself may be best understood with reference to the following description in conjunction with the accompanying drawings.

DETAILED DESCRIPTION OF THE PREFERRED EMBODIMENT

An embodiment of the system and method for transmitting information from a voice messaging to a receiving terminal will now be described in detail with reference to the accompanying drawings.

Figure 1:
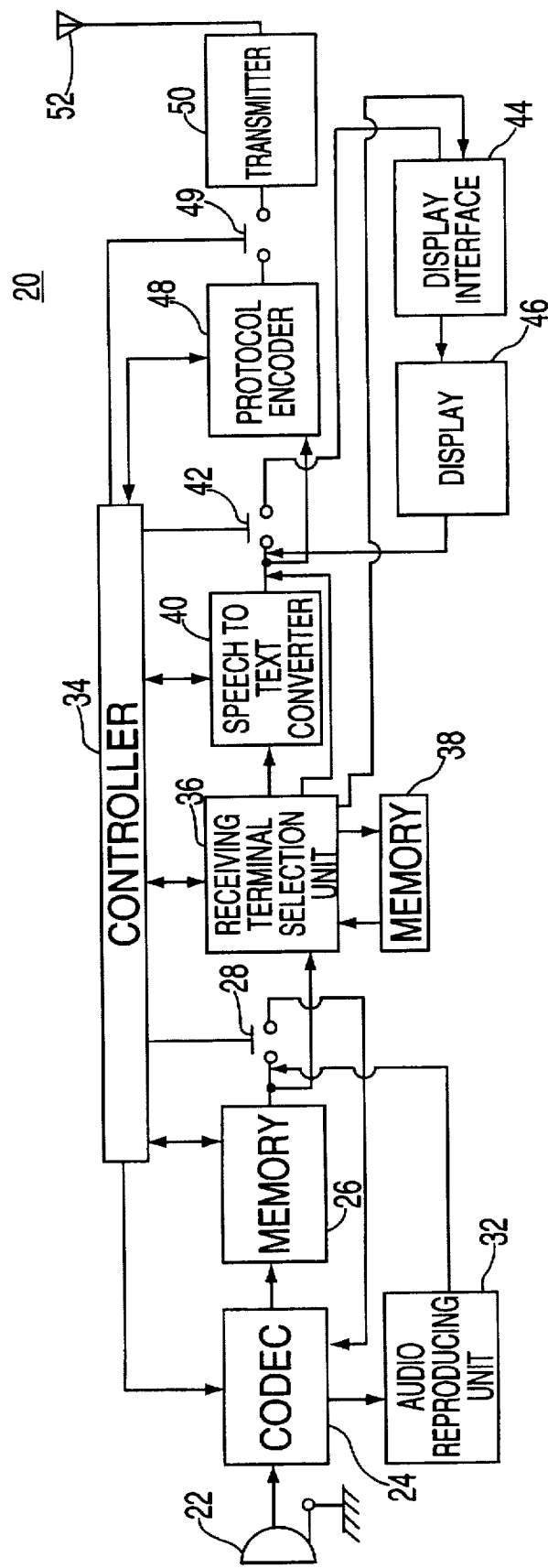
FIG. 1 shows a block diagram of one embodiment of the voice messaging of the present invention.

Referring to FIG. 1, a block diagram of the voice messaging terminal of the present invention is shown. In the preferred embodiment, a voice messaging terminal 20 is a two-way paging terminal, although it will be appreciated that the present invention is not so limited. The messaging terminal 20 preferably includes a microphone 22 for receiving voice signals to be transmitted. The user of the messaging terminal 20 actuates a "record" button or switch (not shown) to begin the recording of the voice signals comprising the message to be transmitted, and then speaks into the microphone 22 ( the output of the microphone may be amplified by an amplifier (not shown) as necessary). The voice signals received in the microphone 22 are then provided to a device 24 which will convert the analog voice signal to a coded digital signal; as shown in FIG. 1, this digitizing device 24 is preferably a CODEC (coder/decoder) (although the CODEC 24 may be implemented as a process carried out in a digital signal processor). Although any CODEC 24 and above-discussed encoding decoding algorithms may be used in the implementation of the subject invention, the preferable CODEC 24 is that embodied in the VCFD-100 chip manufactured by, and commercially available from, Digital Voice Systems, Inc., Burlington, Mass. The VCFD-100 device uses Advanced Multi-Band Exaltation (AMBE) to encode a speech message in real-time into a bitstream in the range of 3.6 to 2.4 Kbps. This equates to a compression ratio 8.8:1 to 13.3:1 as compared with a 32 Kbps PCM representation. Even further real-time voice compression is expected in the near future, and it will be appreciated that the CODEC 24 used in the present invention is meant to encompass such compression technology.

After encoding in the CODEC 24, this coded digital signal is then stored in a memory 26 under the control of controller 34. In one embodiment, the messaging terminal also includes circuitry for playing back the message first recorded in order to verify the accuracy of the message and to make any corrections deemed appropriate. Such playback circuitry generally includes an actuator 28, connected to the memory 26, which when actuated by the user of the messaging terminal 20, will cause the memory 26 to read out the coded digital signal to the CODEC 24 for decoding, the analog output of which is supplied to an audio reproducing unit 32 for reproduction of the voice message. If the user desires to correct or alter the message, he may actuate the "record" button or switch (not shown) again to begin the re-recording. The voice signals comprising the new voice message will then be re-written from the microphone 22 into the memory 26.

The memory 26 in which the encoded voice message is stored is connected to a receiving terminal selection unit 36, the latter of which is further connected to a memory 38, in which are stored the numbers and receiving addresses, of various receiving terminals.

Preferably, the receiving terminal selection unit 36 includes at least an actuator (not shown) connected to the memory 38, so that upon actuation of such actuator, the voice messaging terminal 20 user may read out from memory 38 to a display 44, one or more of the assorted with the receiving terminal(s) to which he will select to transmit a voice message. Actuation of this actuator will also preferably cause memory 26 to read out the encoded voice message stored therein to the receiving terminal selection unit 36, where the encoded voice message will be associated with the number and receiving address of the selected receiving terminal(s).

The receiving terminal selection unit 36 in conjunction with memory 38, and under the control of controller 34, determines whether the selected receiving terminal is capable of reproducing voice messages. In one embodiment, the receiving terminal selection unit 36 makes this determination according to the number or receiving address of the selected receiving terminal(s). For example, it is known that providers of paging, and other messaging services, assign a group of numbers/addresses to those messaging and paging devices which are members of its service. It is anticipated that messaging service providers will further group these number/addresses according to the type of service to which the member devices have subscribed; e.g., out of a group of numbers ranging from 1,000,000 to 3,000,000, a first block of numbers from, for example, 1,000,000, to 2,500,000; would be assigned to text paging services and related devices, while a second block of numbers, for example 2,500,001 to 3,000,000, would be assigned to voice messaging services and related devices. The devices which are members of such paging and voice messaging services, could then have preprogrammed into the memory 38 (and/or associated software or firmware in the receiving terminal selection unit 36) an identifying flag which would indicate that those receiving terminals having the numbers/addresses 1,000,000 to 2,500,000 comprise text pagers, while those receiving terminals having the numbers/addresses 2,500,001 to 3,000,000 are voice messaging devices. Thus, when the voice messaging terminal user selects the receiving terminal from the receiving terminal selection unit 36, the selected receiving terminals number/address with the appropriate identifying flag appended thereto, would be read out from memory 38 and processed in the voice messaging terminal according to the identifying flag, as will be discussed in the forthcoming paragraphs. Of course, it will be appreciated by those skilled in the art that alternative means for making such a determination may be implemented via hardware, software and/or firmware in the voice messaging terminal, and it is intended that such alternative means be embraced within the scope of the present invention.

Once the receiving terminal(s) have been selected in, and their voice reproducing capability determined by, the receiving terminal selection unit 36, the coded digital signal representing the voice message will be provided to a speech-to-text converter 40, or directly to a protocol encoder 48, accordingly. Thus, if the receiving terminal selection unit 36 determines that the receiving terminal is capable of reproducing the voice message, then the coded digital signal will be directly provided to the protocol encoder 48, where it will be encoded with a communications protocol appropriate to the particular messaging service and coding standard being used (e.g., the POCSAG standard, Motoroh's FLEX standard, etc). After being encoded with a communications protocol, the encoded digital voice signal will be transmitted from transmitter 50 through antenna 52 to the appropriate receiving terminal(s) upon actuation of a transmission actuator 49.

If, however, the receiving terminal selection unit 36 determines that the receiving terminal is not capable of reproducing the voice message, then the coded digital signal representing the voice message will be provided to the speech-to-text converter 40, where the coded digital signal will be converted into a text message. The speech-to-text converter may comprise any speech recognition device, but preferably is one of the commercially available speech recognition devices selected from the RSC series manufactured by Sensory Circuits, Inc., San Jose, Calif. The thus converted message will then be provided to a protocol encoder 48, where it will be encoded with a communications protocol and then transmitted from transmitter 50 through transmitter 52 to the appropriate receiving terminal(s), upon actuation of transmission actuator 49.

Thus, for example, if the receiving terminal selection unit 36 were to determine that the receiving terminal were a modem-connected computer having no voice reproduction capability, or a facsimile machine or text-only pager, the encoded voice message would be convened to a text message in the speech-to-text converter 40, encoded with a communications protocol, and transmitted. In this manner, the user of a voice messaging terminal may communicate with any other receiving terminal, irrespective of the receiving terminal's capability of reproducing the voice message.

In the preferred embodiment, there is also provided an actuator 42, connected to the speech-to-text converter 40 and the display 46 of said voice messaging terminal 20 via a display interface 44. Under the control of the controller 34, actuation of the actuator 34 will cause the text message to be displayed on the display 46, so that the user may ensure accuracy of the speech-to-text conversion, and make changes as appropriate. If the user determines that the text message does not comprise the recorded voice message, he may re-record the voice message, encode the re-recorded voice message in the CODEC 24, and then convert the newly resulting coded digital signal to a text message in the speech-to-text converter 40. This process may be repeated as necessary to ensure the accuracy of the text message.

Figure 2:
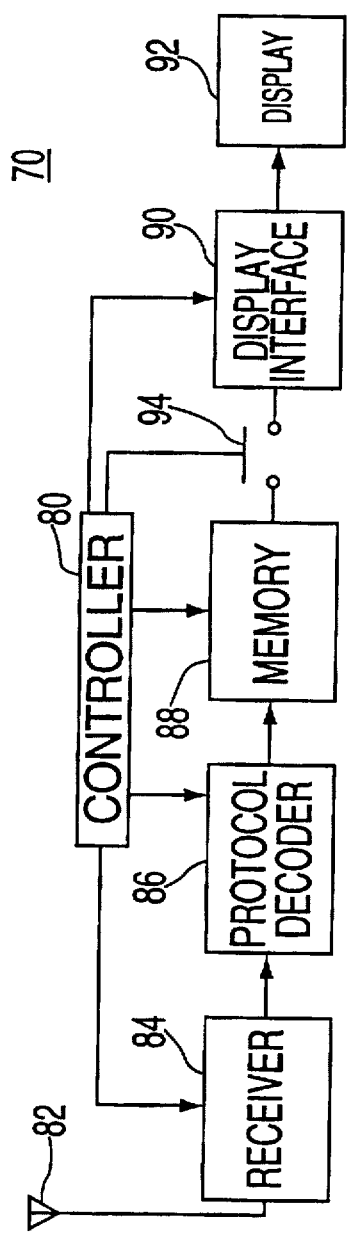
FIG. 2 shows a block diagram of a receiving terminal which is incapable of reproducing the voice message transmitted from the transmitting terminal of FIG. 1.
Figure 3:
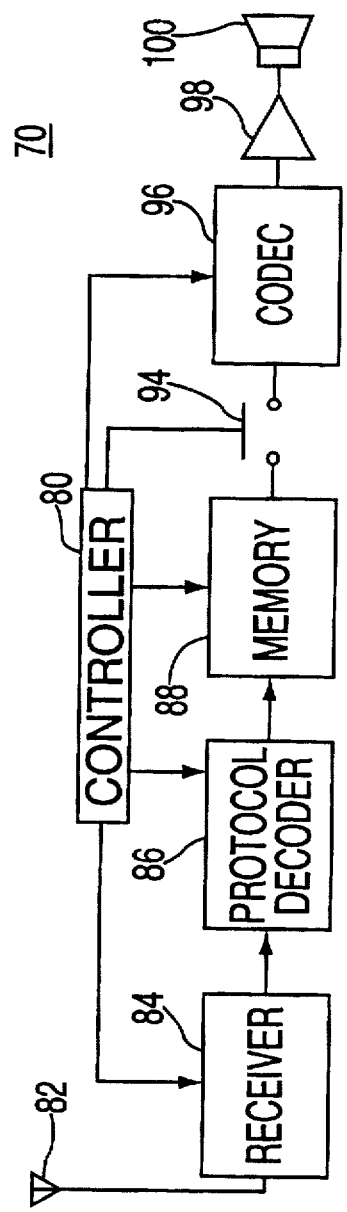
FIG. 3 shows a block diagram of a receiving terminal which is capable of reproducing the voice message transmitted from the transmitting terminal of FIG. 1.

FIGS. 2 and 3 show embodiments of the receiving terminals 70 of the present invention. The receiving terminal 70 of FIG. 2 is not capable of receiving the transmitted voice message, and thus will receive the transmitted message which has been converted to a text message in the messaging terminal 20. Under the control of controller 80, the message will be received through an antenna 82, into a receiver 84. The communications protocol of the received text message will be translated in a protocol decoder 86, and the resulting decoded text message will be stored in a memory 88. Upon actuation of an actuator 94, and under the control of the controller 80, the text message will be forwarded through a display interface 90 for display on a display 92.

Conversely, the receiving terminal 70 of FIG. 3 is capable of receiving the transmitted voice message. Under the control of controller 80, the voice message will be received from the voice messaging terminal 20 through an antenna 82, into a receiver 84. The communications protocol of the received voice message will be translated in a protocol decoder 86, and the resulting voice message will be stored in a memory 99. Upon actuation of an actuator 94, and under the control of the controller 80, the voice message will be decoded in a CODEC 96 (or digital signal processor) to provide an analog signal. This resulting analog signal will then be amplified by amplifier 99 and reproduced at speaker 100.

Figure 4:
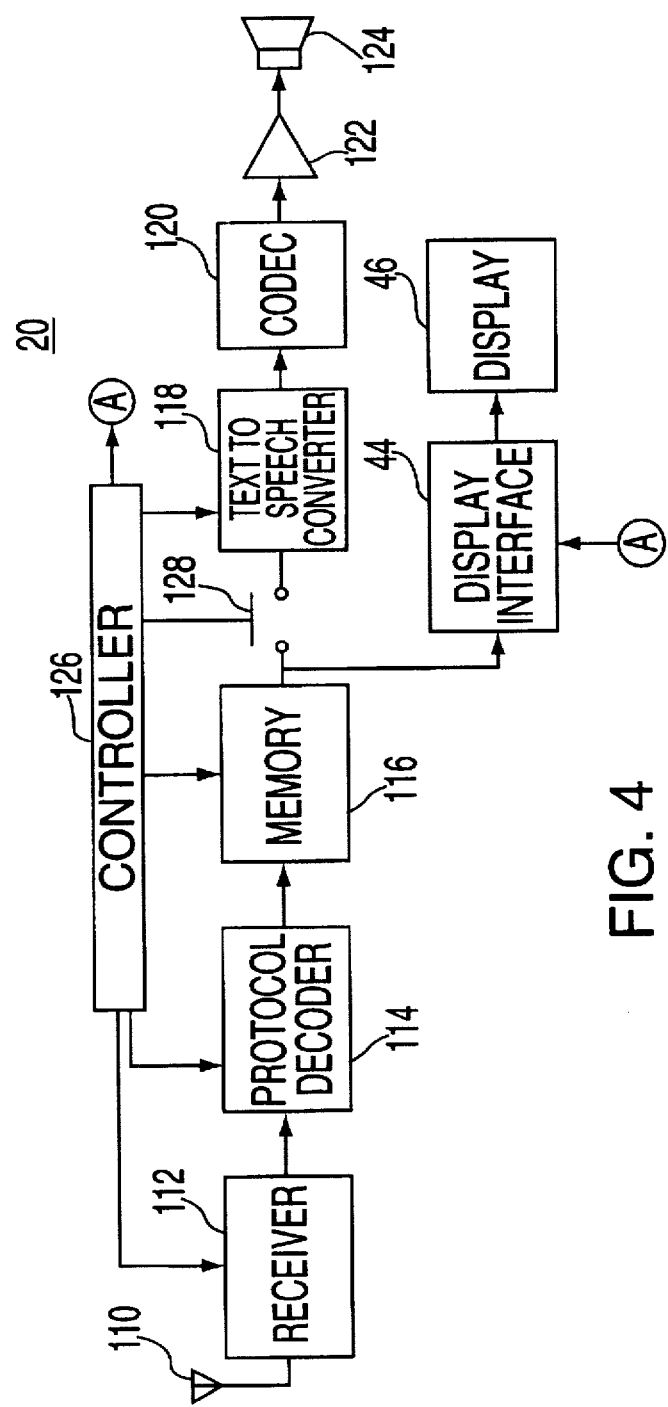
FIG. 4 shows a block diagram of the receiving circuitry of one embodiment of the voice messaging terminal of FIG. 1.

Receiving circuitry of one embodiment of the messaging terminal 20 of the present invention is shown at FIG. 4. In the case where the receiving terminal 70 is also a two-way messaging device, it has the capability of transmitting a response message back to the messaging terminal 20. The response message may be either a voice or text message, depending upon the specification of the receiving terminal 70, and if the response message is a text message, it would be desirable for the user to have the capability of displaying the response message as text on the messaging terminal's 20 display, or reproducing the response message as a synthesized voice signal. For example, in the case where the response message comprises a text message, the user of the messaging terminal 20 might desire to have the response message converted to synthesized speech in order that he might listen to the response message instead of having to tediously scroll through the text.

The voice messaging terminal 20 will receive the response message through antenna 110 (which maybe the same as antenna 38 (FIG. 1)) into receiver 112 under the control of controller 126 (which may be the same as controller 34 (FIG. 1)). The communications protocol of the response text message will be decoded at protocol decoder 14 and the decoded text will be stored in memory 116 (which also maybe the same as memory 26 of FIG. 1) again, under the control of controller 126. In a preferred embodiment, absent the actuation of an actuator 126, the response text message will then be forwarded to the messaging terminal's display 46 through a display interface 44. Again, the user may desire to instead convert the response text message to synthesized voice. By actuating actuator 128, the controller will cause the stored response text message to be read out from memory 116 to a text-to-speech converter 118 for conversion to digitized speech signal, and then to a CODEC 120 for conversion and decoding of the digitized speech signal to an analog speech signal. (It will be appreciated, of course, that the CODEC 120 is preferably the same as CODEC 24 of FIG. 1). The analog signal output from the CODEC 120 is then amplified at an amplifier 122 and reproduced at a speaker 124. Thus, the user of the messaging terminal 20 has the option of either displaying the response text message, or convening the text message to synthesized voice for audio reproduction.

Figure 5:
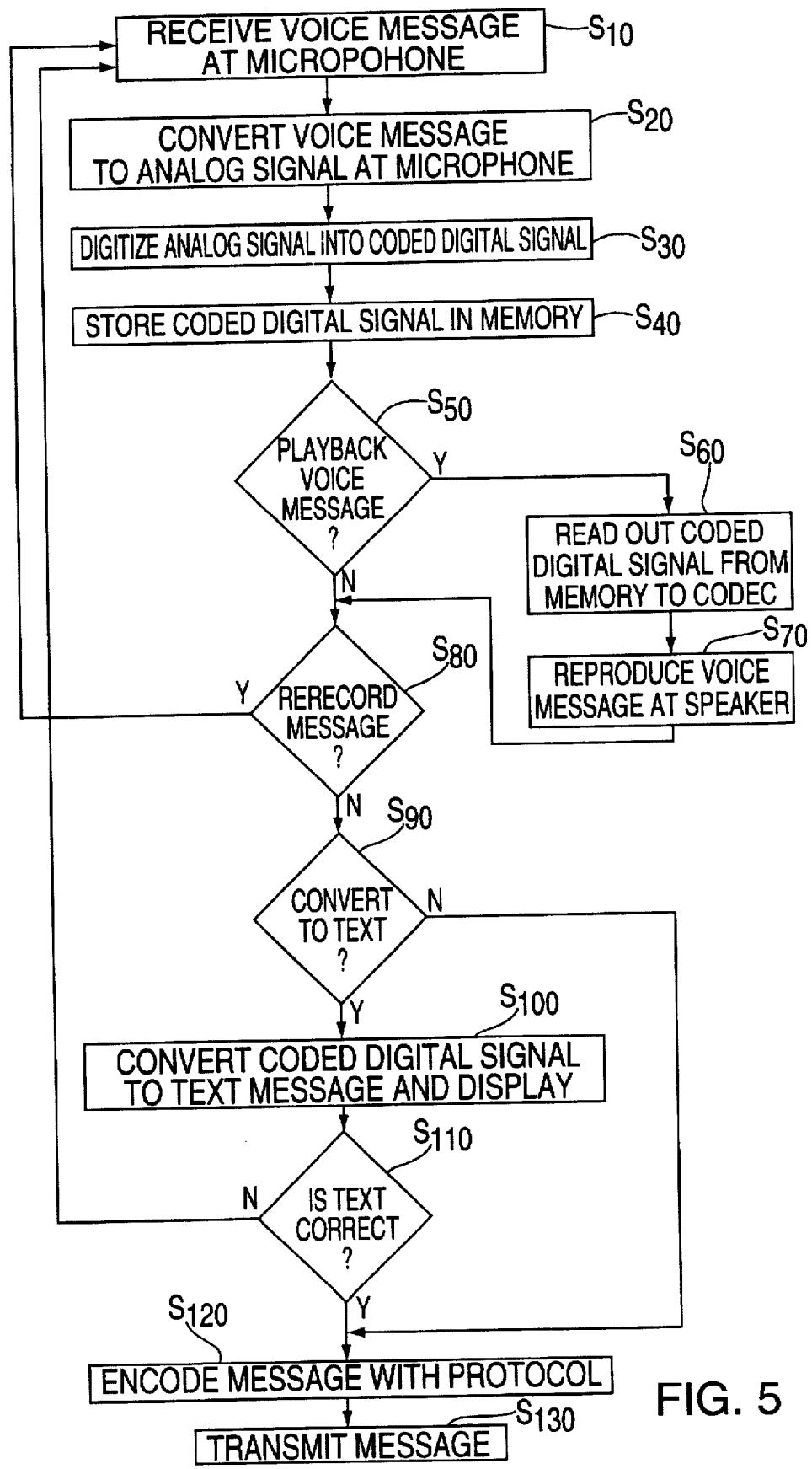
FIG. 5 shows a flowchart describing the operation of the voice messaging terminal of FIG. 1.

The flow chart of FIG. 5 illustrates the process of the present invention. At step S10, the microphone receives the voice signals from the user and converts the voice signals to an analog signal at step S20. The analog signal is digitized into a coded digital signal at step S30, and thereafter stored in a memory at step S40. At step S50, If the user wishes to replay the recorded message, the coded digital signal is read from memory and decoded in the CODEC at step S60, and then reproduced at the speaker (step S70). If the user then desires to re-record the message (step S80), the process branches to the beginning, and steps S10 through S70 are repeated as set forth above. Otherwise, the process proceeds to step S90 where if the receiving terminal selection unit 36 determines that the receiving terminal 70 is incapable of reproducing voice messages, the coded digital signal is convened to a text message and displayed on the display 46 (step S 100). If the user determines that the displayed text message is incorrect at step S10, the process again branches to the beginning and steps S10 through S100 are repeated as set forth previously. If the text is deemed to be correct at step S110, the text message is encoded with a communications protocol at step S 120 and thereafter transmitted to the appropriate receiving terminal(s) at step S130. If, at step S90, it is determined that the receiving terminal is capable of reproducing voice messages, the process branches to step 120, where the encoded digital signal representing the voice message is encoded with the communications protocol. The encoded digital signal is thereafter transmitted to the appropriate receiving terminal(s) at step S130.

Figure 6:
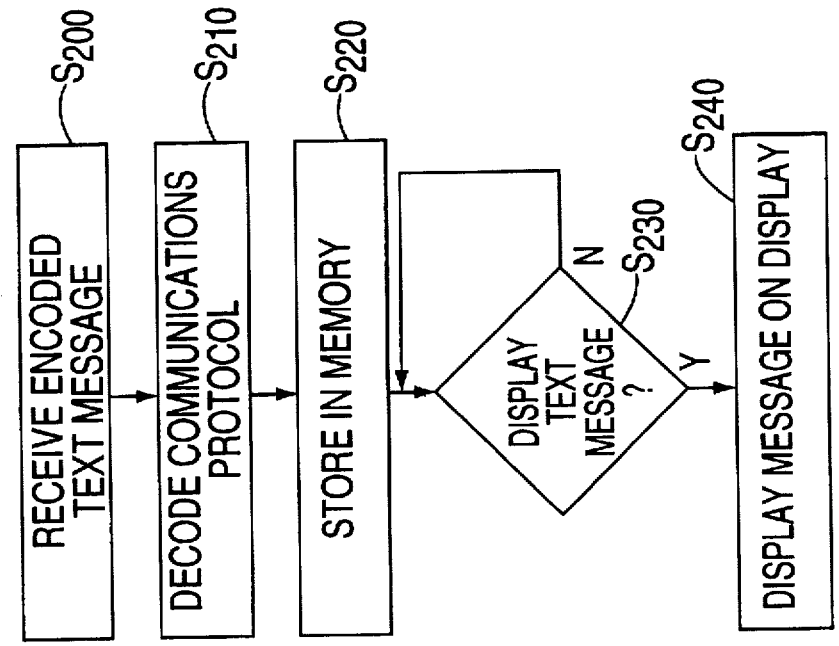
FIG. 6 is a flowchart describing the operation of the receiving terminal of FIG. 2

If the receiving terminal is unable to reproduce the voice message, then the converted text message is received at step S200 (FIG. 6). Thereafter, the communications protocol of the message decoded (step S210), and the decoded message is stored in memory at step S220. Upon actuation of a display actuator at S230, the text message will be displayed at step S240.

Figure 7:
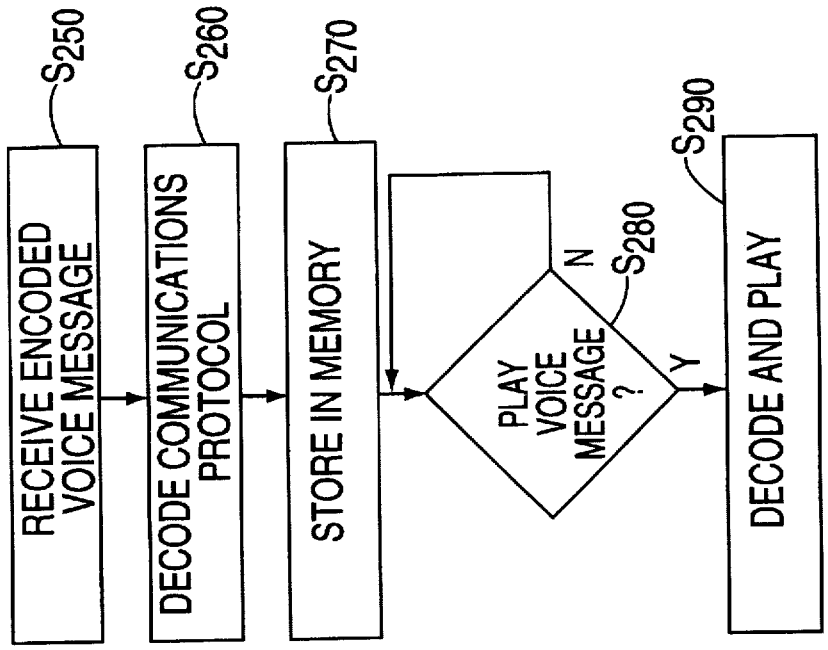
FIG. 7 is a flowchart describing the operation of the receiving terminal of FIG. 3

If the receiving terminal is able to reproduce the voice message, then the converted text message is received at step S250 (FIG. 7). Thereafter, the communications protocol of the message decoded (step S260), and the decoded message is stored in memory at step S270. Upon actuation of a play actuator at S280, the voice message will be decoded and reproduced at step S290.

It is apparent that in accordance with the present invention, an embodiment that fully satisfies the objectives, aims and advantages is set forth above. While the invention has been described in conjunction with specific embodiments, it is evident that many alternatives, modifications, permutations and variations will become apparent to those skilled in the art in light of the foregoing description. Other embodiments will occur to those skilled in the art. Accordingly, it is intended that the present invention embrace all such alternatives, modifications and variations as fall within the scope of the appended claims.

What is claimed is:

1. A voice messaging terminal for communicating with at least one receiving terminal, comprising:

microphone means for receiving a voice message, and for converting said voice message to an analog electrical signal;

first processing means for digitizing said analog electrical signal into a coded digital signal;

a first memory for storing said coded digital signal;

receiving terminal selection means connected to said first memory for determining whether said at least one receiving terminal is capable of reproducing said voice message and for providing a first output of said at least one receiving terminal is not capable of reproducing said voice message and for providing a second output of said at least one receiving terminal is capable of reproducing said voice message;

converter means for converting said coded digital signal into a text message in response to said first output from said receiving terminal selection means;

encoding means for encoding said text message with a communications protocol to provide an encoded text message in response to said first output from said receiving terminal selection means and for encoding said coded digital signal with said communications protocol to provide an encoded digital voice message in response to said second output from said receiving terminal selection means; and, transmitting means for transmitting said encoded text message in response to said first output from said receiving terminal selection means and for transmitting said encoded voice message in response to said second output from said receiving terminal selection means.

2. The voice messaging terminal of claim 1, further comprising playback means connected to said first memory for replaying said stored coded digital signal as said voice message.

3. The voice messaging terminal of claim 2, wherein said playback means include:

an actuator connected to said first memory, wherein actuation of said actuator causes said first memory to read out said stored coded digital signal to said first processing means;

first audio reproducing means, for receiving the output of said first processing means, and for reproducing said voice message.

4. The voice messaging terminal of claim 1, wherein said second memory comprises a nonvolatile memory.

5. The voice messaging terminal of claim 1, further comprising a second memory connected to said receiving terminal selection means, said second memory for storing an address of said at least one receiving terminal and for storing information relating to said at least one receiving terminal's capability of reproducing said voice message.

6. The voice messaging terminal of claim 1, wherein said first processing means comprises a CODEC.

7. The voice messaging terminal of claim 6, wherein said CODEC includes a digital signal processor.

8. The voice messaging terminal of claim 1, wherein said receiving terminal selection means further comprises means for enabling selection of said at least one receiving terminal to which said voice message is to be transmitted.

9. The voice messaging terminal of claim 1, wherein said at least one receiving terminal comprises:

first receiving means for receiving said encoded text message;

decoding means for decoding said communications protocol of said encoded text message;

a third memory for storing said decoded text message; and, a display to display said decoded text message.

10. The voice messaging terminal of claim 9, wherein said at least one receiving terminal further comprises an actuator, wherein actuation of said actuator causes said decoded text message to be displayed on said display.

11. The voice messaging terminal of claim 1, wherein said at least one receiving terminal comprises:

first receiving means for receiving said encoded voice message;

decoding means for decoding said communications protocol of said encoded voice message;

a third memory for storing said decoded voice message;

second processing means for decoding said stored voice message to produce an analog signal; and, second audio reproducing means for reproducing said analog signal as said voice message.

12. The voice messaging terminal of claim 11, wherein said second processing means comprises a CODEC.

13. The voice messaging terminal of claim 12, wherein said CODEC includes a digital signal processor.

14. The voice messaging terminal of claim 11, wherein said second audio reproducing means include:

an actuator connected to said third memory, wherein actuation of said actuator causes said third memory to read out said stored coded digital signal to said CODEC, the output of said CODEC being an analog signal;

an amplifier for amplifying the analog signal output of said CODEC; and, a speaker connected to said amplifier to reproduce said analog signal output.

15. The voice messaging terminal of claim 9, wherein said at least one receiving terminal further comprises means for providing a response text message in response to said received text message, and wherein said voice messaging terminal further comprises:

second receiving means for receiving said response text message having a communications protocol;

decoder means for decoding said communications protocol of said response text message;

a fourth memory for storing said decoded response text message;

means for displaying said response text message.

16. The voice messaging terminal of claim 15, wherein said voice messaging terminal further comprises:

text-to-speech converter means for converting said response text message into coded speech signals, wherein said coded speech signals are provided to said first processing means for decoding said coded speech signals to produce an analog signal and wherein said analog signal is reproduced by said first audio reproducing means amplified by said first amplifier and said analog signal is reproduced at said first speaker.

17. The voice messaging terminal of claim 1, wherein said at least one receiving terminal comprises a computer.

18. The voice messaging terminal of claim 1, wherein said at least one receiving terminal comprises a personal digital assistant.

19. The voice messaging terminal of claim 1, wherein said at least one receiving terminal comprises a facsimile machine.

20. The voice messaging terminal of claim 1, wherein said at least one receiving terminal comprises a text-only messaging terminal.

21. A voice messaging terminal for communicating with at least one receiving terminal, said voice messaging terminal comprising:

a microphone for receiving a voice message, and for converting said voice message to an analog electrical signal;

a first CODEC for digitizing said analog electrical signal into a coded digital signal;

a first memory for storing said coded digital signal;

a receiving terminal selection means, including a second memory, and connected to said first memory for determining whether said at least one receiving terminal is capable of reproducing said voice message;

a speech-to-text converter for converting said coded digital signal into a text message of said receiving terminal selection means determines that said at least one receiving terminal is not capable of reproducing said voice message;

a protocol encoder means for encoding said coded digital signal with a communications protocol to provide an encoded digital voice message of said receiving terminal selection means determines that said at least one receiving terminal is capable of reproducing said voice message and for encoding said text message with said communications protocol to provide an encoded text message of said receiving terminal selection means determines that said at least one receiving terminal is not capable of reproducing said voice message; and, a transmitter for transmitting said encoded digital voice message of said receiving terminal selection means determines that said at least one receiving terminal is capable of reproducing said voice message and for transmitting said encoded text message if said receiving terminal selection means determines that said at least one receiving terminal is not capable of reproducing said voice message.

22. The voice messaging terminal of claim 21, further comprising playback means connected to said first memory for replaying said stored coded digital signal through said first CODEC as said voice message.

23. The voice messaging terminal of claim 22, wherein said playback means include:

an actuator connected to said first memory, wherein actuation of said actuator causes said first memory to read out said stored coded digital signal to said first CODEC;

a first amplifier for amplyifing the analog signal output from said CODEC; and, a first speaker connected to said amplifier to reproduce said analog signal.

24. The voice messaging terminal of claim 21, wherein said first memory comprises a nonvolatile memory.

25. The voice messaging terminal of claim 21, wherein said second memory stores a plurality of addresses, including an address of said at least one receiving terminal and further stores information relating to said at least one receiving terminal's capability of reproducing said voice message.

26. The voice messaging terminal of claim 21, wherein said first CODEC includes a digital signal processor.

27. The voice messaging terminal of claim 21, wherein said receiving terminal selection means further comprises means for enabling selection of said at least one receiving terminal to which said voice message is to be transmitted.

28. The voice messaging terminal of claim 21, wherein said at least one receiving terminal comprises:

a first radio frequency receiver for receiving said encoded text message;

a decoder for decoding said communications protocol of said encoded text message;

a third memory for storing said decoded text message; and, a display to display said decoded text message.

29. The voice messaging terminal of claim 28, wherein said at least one receiving terminal further comprises an actuator, wherein actuation of said actuator causes said decoded text message to be displayed on said display.

11

30. The voice messaging terminal of claim 1, wherein said at least one receiving terminal comprises:

a first radio frequency receiver for receiving said encoded voice message;

a decoder for decoding said communications protocol of said encoded voice message;

a third memory for storing said decoded voice message;

a second CODEC for decoding said stored voice message to produce an analog signal;

an second amplifier for amplifying said analog signal; and, a second speaker for reproducing said amplified analog signal as said voice message.

31. The voice messaging terminal of claim 30, wherein said second CODEC includes a digital signal processor.

32. The voice messaging terminal of claim 30, wherein at least one receiving terminal further comprises an actuator connected to said third memory and to said second CODEC, wherein actuation of said actuator causes said third memory to read out said stored decoded voice message to said CODEC.

33. The voice messaging terminal of claim 22, wherein said at least one receiving terminal further comprises means for providing a response text message in response to said received text message, and wherein said voice messaging terminal further comprises:

a second radio receiver for receiving said response text message having a communications protocol;

a decoder for decoding said communications protocol of said response text message;

a fourth memory for storing said decoded response text message; and, a display for displaying said response text message.

34. The voice messaging terminal of claim 33, wherein said voice messaging terminal further comprises:

a text-to-speech converter for converting said response text message into coded speech signals, wherein said coded speech signals are provided to said first CODEC for decoding said coded speech signals to produce an analog signal and wherein said analog signal is amplified by said first amplifier and said analog signal is reproduced at said first speaker.

35. A method for providing communications from a voice messaging terminal to at least one receiving terminal, comprising the steps of:

receiving a voice message at a microphone;

converting said voice message into an analog electrical signal at said microphone;

digitizing said analog electrical signal into a coded digital signal;

12 storing said coded digital signal in a first memory;

determining whether said at least one receiving terminal is capable of reproducing said voice message;

converting said coded digital signal into a text message if a receiving terminal selection means determines that said at least one receiving terminal is not capable of reproducing said voice message;

encoding said coded digital signal with a communications protocol to provide an encoded digital voice message if said receiving terminal selection means determines that said at least one receiving terminal is capable of reproducing said voice message or encoding said text message with said communications protocol to provide an encoded text message of said receiving terminal selection means determines that said at least one receiving terminal is not capable of reproducing said voice message; and, transmitting said encoded digital voice message of said receiving terminal selection means determines that said at least one receiving terminal is capable of reproducing said voice message or transmitting said encoded text message of said receiving terminal selection means determines that said at least one receiving terminal is not capable of reproducing said voice message.

36. The method of claim 35, further comprising the steps of:

receiving said encoded text message in a first one of said at least one receiving terminals;

decoding said communications protocol of said encoded text message;

storing said decoded text message in a second memory; and, displaying said decoded text message.

37. The method of claim 35, further comprising the steps of:

receiving said encoded voice message in a second one of said at least one receiving terminals;

decoding said communications protocol of said encoded voice message;

storing said decoded voice message in a second memory;

decoding said stored voice message to produce an analog signal; and, reproducing said analog signal as said voice message.

38. The method of claim 35, wherein said digitizing step is carried out in a CODEC.

39. The method of claim 35, wherein said converting step is carried out in a speech to text converter.

40. The method of claim 37, wherein said stored voice message decoding step is carded out in a CODEC.

* * * * *